United States Patent [19]
Niemoth

[11] 3,721,970
[45] March 20, 1973

[54] ALKALI METAL LEAK DETECTOR
[75] Inventor: Hubert R. Niemoth, Elmhurst, Ill.
[73] Assignee: United States of America as represented by the United States Atomic Energy Commission
[22] Filed: Oct. 6, 1971
[21] Appl. No.: 187,043

[52] U.S. Cl. .................340/242, 73/49.1, 200/61.05
[51] Int. Cl. .............................................G08b 21/00
[58] Field of Search ..340/242; 73/40, 40.5, 46, 49.1, 73/49.2, 49.3; 200/61.04, 61.05; 137/312; 174/11 R

[56] References Cited

UNITED STATES PATENTS

| | | | |
|---|---|---|---|
| 2,601,840 | 7/1952 | Smith et al.............................73/46 X |
| 2,691,134 | 10/1954 | Ford.................................340/242 X |
| 2,708,896 | 5/1955 | Smith et al............................73/46 X |
| 2,759,175 | 8/1956 | Spalding......................200/61.04 X |
| 3,452,146 | 6/1969 | Humphrey.........................174/11 R |

FOREIGN PATENTS OR APPLICATIONS

| | | | |
|---|---|---|---|
| 1,016,928 | 1/1966 | Great Britain.....................73/40.5 R |
| 1,212,327 | 3/1960 | France .....................................73/40 |
| 1,377,519 | 9/1964 | France..............................73/40.5 R |

Primary Examiner—John W. Caldwell
Assistant Examiner—Daniel Myer
Attorney—Roland A. Anderson

[57] ABSTRACT

A layer of refractory fiber insulation such as a felt sheet consisting essentially of aluminum silicate fibers is placed between two layers of conducting material, such as steel screens which are connected in an electrical circuit to a detecting device, such as an electric light. This device is a leak detector in which a drop of liquid sodium, potassium or other alkali metal will short out the screens and give a signal on the detecting device.

7 Claims, 2 Drawing Figures

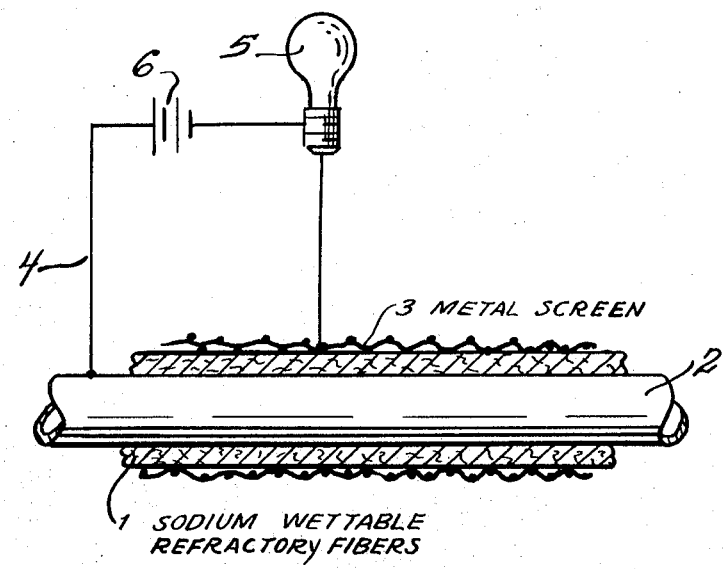
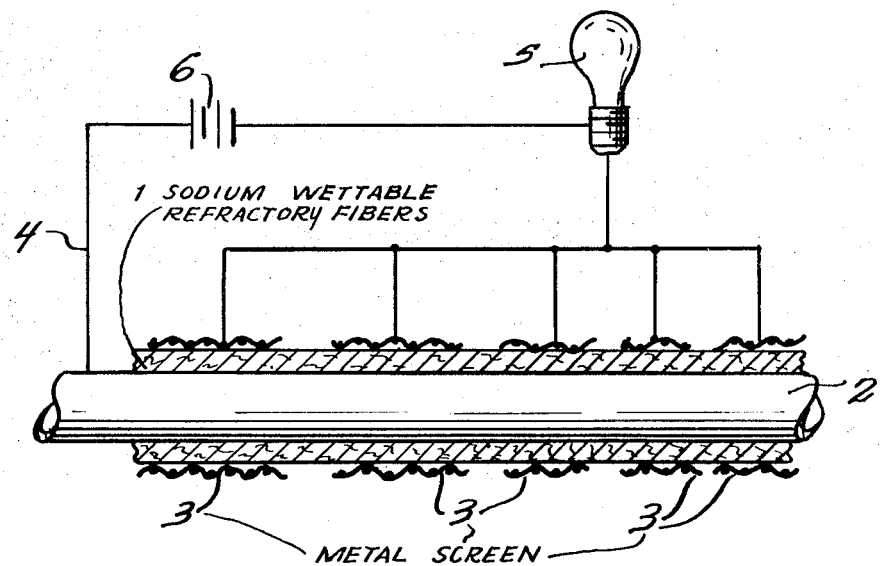

3,721,970

ALKALI METAL LEAK DETECTOR

CONTRACTUAL ORIGIN OF THE INVENTION

The invention made herein was made in the course of, or under, a contract with the United States Atomic Energy Commission.

BACKGROUND OF THE INVENTION

The invention relates to a device for detecting liquid alkali metal leaks in an alkali metal containment system, and more particularly to a device for detecting liquid sodium and liquid sodium potassium alloy leaks in the coolant system of nuclear reactors containing such alkali metal, such as, for example, in the loop of the liquid metal fast breeder reactors.

The escape of liquid sodium into the air can result in dangerous fires, or at least in the oxidation of the alkali metal which will bring about corrosion. Such corrosion in time causes a catastrophic failure of either or both the alkali metal filled pipes or the steam pipes of the reactor. The early detection of an alkali metal leak is, therefore, very important.

Various devices and methods of detecting sodium leaks have been used. These include sodium collector-type leak systems, systems of sodium leakage into a liquid, and sodium ignition systems in which the fumes, smoke or flame from the leaked sodium is detected. Another method involves the use of a grid of anodized aluminum wire placed below the heat exchangers. The resistance between the intersecting wires is measured, a significant decrease being indicative of failure of the insulating film at the intersections. These prior devices and methods are expensive and not entirely reliable.

An object of this invention is to provide a simple, inexpensive and reliable device and method for detecting liquid alkali metal leaks.

Other objects and advantages will become apparent as the following description progresses, reference being had to the accompanying drawing wherein FIG. 1 is a cross section of a pipe incorporating the device of this invention and FIG. 2 shows an alternative embodiment.

SUMMARY OF THE INVENTION

In accordance with this invention an insulating layer of a composition comprising sodium wettable refractory fibers, such as a layer of a composition consisting essentially of aluminum silicate fibers, is placed between two layers of conducting material which are connected in an electrical circuit to a device for detecting electric current. This device is a leak detector in which a drop of liquid sodium, potassium or other alkali metal will short out the two conducting layers and give a signal on the detecting device.

The insulating layer is preferably in the form of a felt sheet of aluminum silicate fibers. The sheet may contain other material, such as minor amounts of boron oxide, aluminum oxide and sodium silicate binder. A particularly satisfactory insulating felt is that sold by Refractory Products Co. under the name of WRPX AQ Felt. This material consists essentially of short aluminum silicate fibers felted into a sheet. It contains a small amount of water which is baked out before use.

A layer of aluminum silicate fiber batting or a woven fiber sheet may also be used as the insulating layer.

The conducting layers may be in the form of a metal screen, such as a stainless steel screen wire. One of the conducting layers may be the metal pipes containing the sodium or other alkali metal.

In making the detector device, a layer of the wet insulating sheet is sandwiched between two sheets of the conducting material, which are used as the two contacts to an electrical indicating circuit.

The assembly is baked out to remove the moisture that is generally present in the insulation sheet.

With aluminum silicate fiber sheets, an insulating sheet having a dielectric constant at 25°C of 4.81 at 100 cycles is readily attained.

The aluminum silicate fiber insulation is not softened by water and its acid and chemical resistance is good. It is attacked by alkali.

While I do not wish to be restricted to any theory as to the mechanism of the action of my device or reason for its fast and reliable action, it is believed that the aluminum silicate fibers, particularly in felt form, are readily wettable by sodium which, on leakage from the surrounding pipe or container, is drawn by capillary action through the insulating layer so that both conducting layers are quickly contacted by the sodium thus closing the electrical circuit and giving a signal for the leak. Also, it is believed that the action is accelerated by the fact that the sodium or other alkali metal attacks the insulation and eventually destroys it.

The whole indicator assembly can be molded around pipes or valves with ease, so that very close proximity to the leak area will exist which produces fast response. With wire screens, the close weave spacing between wires makes for more complete coverage of the entire area.

The detectors may also be tailored to large or small areas and remotely monitored. For example, there may be a plurality of patches of steel screen, each in contact with selected portions of the exposed surface of the refractory felt insulation with means for electrically connecting each of said patches to a remote detector system, said system being responsive to a circuit completion by a drop of sodium or other liquid alkali metal at any of said patches.

The detection device is useful in detecting leaks in any type of container containing liquid alkali metal, and has been found particularly satisfactory for detecting leaks in pipes containing hot liquid sodium and hot liquid sodium potassium alloy, called NAK, used in nuclear reactor systems.

Any type of sodium or potassium wettable refractory fiber may be used including quartz fibers and zirconium silicate fibers, but these, while operable, are not preferred and do not have all the advantages of the aluminum silicate fibers for obtaining quick and reliable leak detection for hot liquid alkali metal leakage.

DETAILED DESCRIPTION OF THE INVENTION

An illustrative embodiment of the invention is shown in the accompanying drawing in FIG. 1 of which a thin aluminum silicate felt sheet of ⅛ inch thickness 1 is wrapped around a metal pipe 2 of the heat exchange loop of a liquid metal fast breeder nuclear reactor (LMFBR). A stainless steel close woven metal screen 3 was then wrapped around and in close contact with the insulator felt sheet. The assembly was baked to remove moisture from the insulating sheet and gave a dielectric constant at 25°C of 4.81 at 100 cycles.

In the device shown in the drawing the electrical circuit 4 provided with power supply 6 causes the light bulb 5 to light when liquid alkali metal leaks through the pipe walls 2 and through the felt 1 to contact the metal screen 3.

Various types of signaling devices other than light bulbs, as well known to the art, may, of course, be used.

A second embodiment is shown in FIG. 2 wherein the same reference characters are used, reference character 3 now referring to a plurality of patches of a conducting screen rather than a single screen as in FIG. 1.

It will be understood that the invention is not to be limited to the details given herein, but that it may be modified within the scope of the appended claims.

The embodiments of the invention in which an exclusive property or privilege is claimed are defined as follows:

1. An alkali metal leak detector comprising an insulating sheet consisting essentially of sodium wettable refractory fibers in contact on each side of the sheet with electricity conducting layers, and means for detecting the completion of an electrical circuit between said conducting layers when shorted by liquid alkali metal.

2. A leak detector in accordance with claim 1 in which the sodium wettable refractory fibers are aluminum silicate fibers.

3. A leak detector in accordance with claim 2 in which the sheet is a felt sheet.

4. A leak detector in accordance with claim 3 in which at least one of the conducting layers is a steel screen.

5. A leak detector in accordance with claim 1 in which at least one of the conducting layers is a metal screen.

6. An alkali metal leak detector comprising a thin layer sodium wettable refractory felt insulation molded against the surface of a container to be monitored, said container being an electrical conductor, a plurality of patches of a conducting screen each positioned against selected portions of the exposed surface of said insulation, and means for electrically connecting each of said patches to a remote detector, said detector being responsive to a circuit completion caused by contact of liquid alkali metal with any of said patches.

7. A leak detector in accordance with claim 6 in which the refractory felt comprises fibers of aluminum silicate.

* * * * *